May 19, 1953     S. A. SCHERBATSKOY     2,639,390

RADIATION DETECTING DEVICE

Filed Dec. 15, 1950

INVENTOR.

Serge A Scherbatskoy

Patented May 19, 1953

2,639,390

UNITED STATES PATENT OFFICE 2,639,390

RADIATION DETECTING DEVICE

Serge A. Scherbatskoy, Tulsa, Okla.

Application December 15, 1950, Serial No. 200,920

4 Claims. (Cl. 250—83.6)

My invention relates to radiation detecting devices and more particularly to a device of the counter type for detecting and measuring penetrative radiation such as gamma rays, neutrons, beta rays, and other atomic and nuclear particles.

The radiation counter operates by the production of an electrical discharge in a gas. The counter is extremely sensitive and a discharge may be produced when a single ion pair is produced almost anywhere in the tube. It is extremely difficult to assure that a counter even very carefully made to any specification will be satisfactory and uniform in all its characteristics. The extreme sensitivity of the counter renders it liable to drifts and spontaneous discharges, the origin of which is uncertain. Furthermore, the characteristics of the discharge are also often found to change with time, temperature, and exposure to radiation, and other factors.

It is the purpose of my invention to compensate for drifts in a radiation counter and to provide an automatic controlling arrangement that will insure the stability of operation of the device.

It is another purpose of my invention to compensate for changes in counter characteristics and to provide a control arrangement for automatically adjusting the voltage supply in response to any departure of the counter from normal operating condition.

Other objects, together with some of the advantages to be derived in utilizing the present invention, will become apparent from the following detailed description, taken together with the accompanying drawings, wherein.

Figure 1:
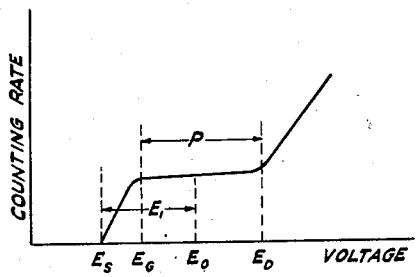
Fig. 1 shows a typical characteristic curve of a radiation counter.

Referring now more particularly to Fig. 1 there is shown a diagram illustrating the characteristic of a radiation counter. The diagram is in form of a graph showing the counting rate against voltage applied between cathode and anode for a constant intensity of irradiation, as for example, with the gamma rays from one milligram of radium at a determined distance from the counter. The shape of the curve depends partly on the circuit. $E_s$ is by definition the starting potential, i. e. the voltage which must be applied to a counter to cause it to count and below which no discharges occur. $E_G$ is the threshold potential; it corresponds to the beginning of the strictly nonproportional region. After reaching the voltage $E_D$ the counting rate begins to rise again due to self-excitation and production of spurious counts. Region P comprised between the voltages $E_G$ and $E_D$ is known as the plateau. The plateau is the region at which satisfactory operation of the counter occurs.

Let $E_o$ designate the operating voltage, i. e. the voltage at which the counter is operated. This is the voltage across the counter measured between the cathode and anode. As shown in Fig. 1, the plateau is of limited width and, consequently, a radiation counter operates satisfactorily over a relatively limited range of voltages. For example, some counters operate satisfactorily at $E_o=1050$ volts but will cease operating properly at a voltage much higher than 1100 volts and will also cease operating at a voltage much lower than 1000 volts. Many Geiger counters have a plateau which is sometimes no larger than a few per cent of the operating voltage.

It is also well known that the operating voltage of a Geiger counter is not always exactly fixed. Also, it is very difficult to manufacture Geiger counters all having exactly the same operating voltage. The usual technique of operating Geiger counters involves the following steps:

(a) Determine the starting voltage of the Geiger counter.

(b) Determine the length of the plateau and the voltage at which spurious discharges begin to occur, or the voltage at which excessive curvature of the plateau occurs.

(c) Select the operating voltage at a suitable point in the plateau region. There are a number of accepted procedures for the selection of the operating voltage. According to one procedure, the operating voltage should exceed the starting voltage by a certain fixed amount $E_1$, i. e.

$$E_o = E_s + E_1$$

The value $E_1$ may amount, for instance, to 30 volts or to any other fixed voltage within the range of a few volts to over 100 volts.

This procedure can readily be accomplished when a stable voltage supply can be provided and the counter itself is stable. In practice, it has been determined that these stabilities are difficult to obtain and consequently readjustment of the voltage from time to time is necessary.

My invention consists in providing automatic means for readjusting the operating voltage of the counter.

It is apparent that when the counter is operated in the Geiger region as a self-quenching counter, each discharge caused by the passage of a radiation particle is accompanied by a voltage impulse, i. e. the voltage across the counter measured between the cathode and anode is suddenly reduced from the initial value represented by the operating voltage $E_o$ to a final value closer to the starting voltage $E_s$ at which the counter becomes extinguished. There usually is a definite relationship between the magnitude of the voltage impulse $E_k$ and the difference between $E_o$ and $E_s$. In some counters the voltage impulse $E_k$ has the approximate magnitude $$E_k = E_o - E_s \quad (1)$$

As stated above, the characteristics of the counter are usually not stable and due to conditions beyond our control the starting voltage $E_s$ of the counter may undergo unpredictable changes. It would be then desirable to vary the operating voltage $E_o$ in order to follow these changes so as to maintain the value $E_k$ invariant. My invention provides an arrangement in which these variations of the operating voltage $E_o$ are effected automatically.

It is apparent from Formula 1 that when the starting voltage $E_s$ unexpectedly increases (or conversely decreases) and the operating voltage $E_o$ remains the same, then the voltage impulses $E_k$ correspondingly decrease (or increase). In accordance with my invention I utilize the decrease (or increase) of the impulses $E_k$ as a controlling factor in order to adjust automatically a suitable controlling device. This controlling device increases (or conversely decreases) the operating voltage $E_o$ in order to restore the impulses $E_k$ to their previous value.

Thus the controlling device adjusts the operating voltage in response to the output impulses in order to restore these impulses to their normal operating magnitude.

Figure 2:
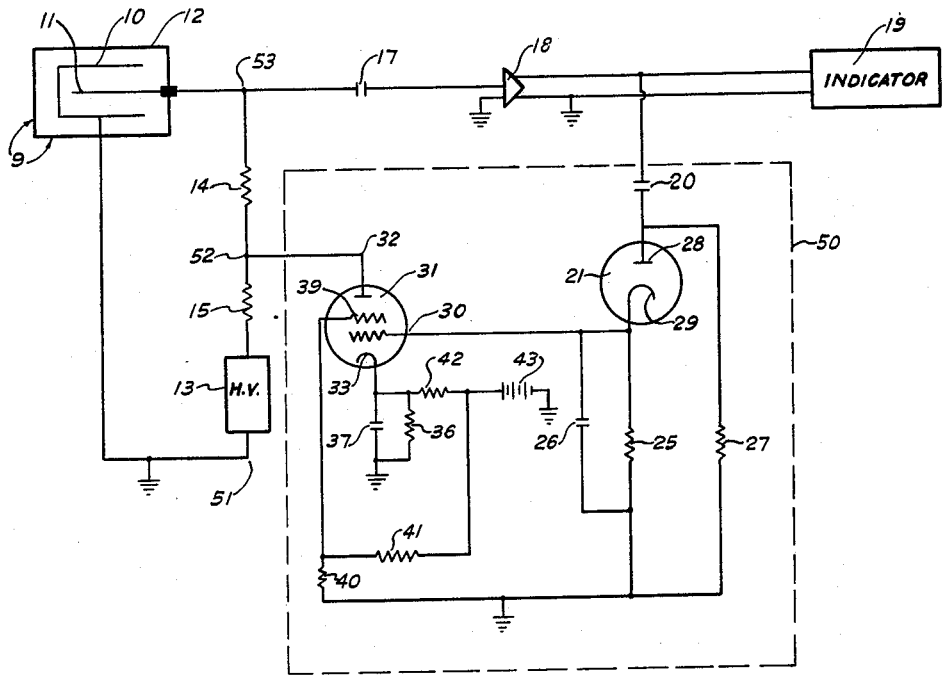
Fig. 2 shows diagrammatically an automatic circuit for varying the voltage supply of radiation counter in response to the departure of the counter from normal operating conditions.

An instrumental arrangement for performing such an automatic control is shown schematically in Fig. 2. The conventional radiation counter 9 shown in Fig. 2 consists of a thin walled metal tube 10 with a very thin wire 11 forming the anode spanned axially and insulated from the metal tube forming the cathode. These electrodes are enclosed in an envelope 12 commonly a glass tube which contains a suitable gas mixture, e. g. mainly argon, at a fairly low pressure, say 5–10 cm. of Hg. The central wire 11 is maintained at a positive potential with respect to the cylinder 10 by means of a high voltage supply 13 (which can be a battery) in series with fairly high resistors 14, 15 placed in the circuit. If a particle capable of ionizing the gas passes through the cylinder 10, a discharge will take place and a current pulse flows through the resistor 14. This causes a voltage drop across the resistor 14 and the discharge will cease after a very short period of time. Suitable treatment of the surface of the cylinder 10 and proper choice of the gases filling the counter will cause the discharge to stop more quickly and reliably.

Each discharge of the counter produces a voltage impulse between the anode and ground. These voltage impulses are transmitted through a coupling condenser 17 to an amplifier 18, the output of said amplifier being in turn connected to an indicator 19 which can be a frequency meter, oscilloscope or other device well known in the art. One of the output terminals of the amplifier 18 is grounded while the other terminal is connected to a condenser 20 in series with a rectifier 21 and a resistor-condenser element consisting of a resistor 25 shunted by a condenser 26. Another resistor 27 is connected between the anode 28 of the rectifier 21 and the ground. The arrangement comprising rectifier 21, condenser 26, and resistor 25 is generally designated as peak voltmeter and it is adapted to produce across the condenser 26 a voltage which is substantially equal to the peak value of the voltage developed across the amplifier 18. The cathode 29 of the rectifier is connected to the grid 30 of a tube 31. The tube 31 has its plate 32 connected to the junction terminal of the resistors 14 and 15. The cathode 33 of the tube 31 is connected to the ground by means of a resistance condenser element, said element consisting of a resistance 36 shunted by the condenser 37.

It is apparent that the tube 31 constitutes a shunt applied to the resistor 15 in series with the high voltage supply 13 and that the equivalent impedance of the shunt may be appropriately varied by means of the voltage applied to the grid 30.

The tube 31 is provided with a screen grid 39 which is connected to the ground by means of resistor 40, the other terminal of said resistor being connected through resistors 41, 42 to the cathode 33. The tube 31 is energized by a battery 43 having its negative terminal grounded and the positive terminal connected to the junction of resistors 41 and 42.

It is apparent that normally in the absence of any radiation the grid 30 is maintained at zero potential and the cathode at a positive potential derived from the battery 43.

The operation of the above arrangement is as follows:

The Geiger counter 9 is energized by the high voltage supply 13. This high voltage supply is chosen to have a substantially higher voltage than will be required for the operation of the Geiger counter. Under normal operating conditions, even in the absence of any external radiation, there is a small current flowing from the battery 13 through a circuit consisting of the resistor 15 in series with the variable resistance tube 31 and the resistance capacitance element 36—37. This current causes a voltage drop across the resistor 15. The actual operating voltage $E_o$ applied to the counter consists of the difference of potential between the terminals 51 and 52 and is equal to the voltage of the battery 13 decreased by the potential drop across the resistor 15.

It is apparent that by varying the potential applied to the grid 30 of the tube 31 the equivalent resistance of the tube varies. This in turn causes variation in the current through the resistor 15 and consequently the variation of the operating voltage $E_o$ derived from the terminals 51, 52. Consequently, by varying the grid voltage of the tube 31 we effect a corresponding variation in the operating voltage of the counter.

Under normal operating conditions whenever the counter discharges due to a passage of a radiation particle, we obtain a sudden voltage impulse at the terminal 53 of the anode. These voltage impulses are applied in a conventional manner to the amplifier 18 and subsequently rectified by means of the rectifier 21. The action of the rectifier and condenser 26 and resistor 25 is such that a D. C. voltage develops across condenser 26 which is substantially equal to the peak value of the voltage output of the amplifier 18. This is achieved by proportioning the values of the circuit so that the time constant determined by condenser 26, internal resistance of rectifier 21, and the output resistance of amplifier 18 is short, and the time constant determined by condenser 26 and resistor 25 is long compared to the average time interval between the pulses. We obtain thus a unidirectional current flowing through the resistor 25 and a voltage proportional to this current appears across the terminals of the condenser 26. This voltage is applied to the grid of the tube 31 and thus maintains the operating voltage of the tube at its normal value.

Assume now that due to some extraneous conditions beyond our control, the starting voltage $E_s$ drifted and assumed a lower (or, conversely a higher) value $E_s$. Assume also that the operating voltage is maintained at its value $E_o$. Consequently, the voltage impulses $E_k$ applied to the terminal 53 increase (or conversely decrease) in magnitude and assume a new value $E'_k = E_o - E'_s$. Consequently, the rectified current passing through the resistor 25 increases (or conversely decreases) in intensity and causes corresponding increase (or decrease) of the voltage at the condenser 26. This increase in voltage applied to the grid 30 of the tube 31 causes a corresponding decrease (or, conversely, increase) in the equivalent resistance of the tube. Consequently, the corresponding current delivered by the battery 13 and passing through the resistor 15 increases (or, conversely, decreases) in magnitude. This in turn increases (or, conversely, decreases) the voltage drop across the resistor 15. Therefore, we obtain at the terminals 51, 52 a new value of the operating voltage $E'_o$ that has changed in magnitude so as to countereffect the drift in the starting potential. The new value $E'_o$ is such that $$E_k = E'_s - E'_o$$

i. e. the voltage impulses $E_k$ are automatically maintained at a constant value.

It is thus apparent that if the voltage impulses developed by the counter are too large (or, conversely, too small) the circuit automatically readjusts itself and decreases (or, conversely, increases) the voltage supplied until it has a lower (or, conversely, higher) value and countereffects the increase (or, conversely, decrease) of the voltage impulses supplied by the counter.

The controlling circuit used in the above arrangement is shown in Fig. 2 enclosed within a dotted line 50.

It is thus apparent that I have provided a radiation counter with a controllable voltage supply for applying a controllable voltage between the electrodes 11 and 12 of the counter. The controllable voltage supply consists of the high voltage supply 13, in series with the resistor 15 and the variable shunt element comprising the tube 31. Under normal operating conditions the counter produces impulses of a determined magnitude $E_k$. It may happen, however, that because of some effects beyond our control the impulses $E_k$ have changed their magnitude and assumed a new value $E'_k$. It is then desirable to have an automatic circuit that will restore the counter to normal operating conditions and will restore the impulses to their normal value $E_k$. I accordingly provide such an automatic circuit that is arranged to be responsive to any departure of the impulses from the normal value $E_k$, and is effective to modify the variable shunt element and thus to effect an appropriate control upon the voltage supplied to the counter. As a result of such a control the voltage between the electrodes of the counter has been changed in such a manner as to restore the magnitude of the impulses to their normal operating value $E_k$.

While I have described my invention in connection with certain specific embodiments thereof, it is to be understood that this is by way of illustration and not by way of limitation and I do not mean to be bound thereby, but only to the scope of the appended claims which should be construed as broadly as the prior art will permit.

I claim:

1. A radiation counter of the type comprising a gas-filled discharge chamber, of the type wherein radiation traversing said discharge chamber is operative to produce voltage pulses, the intensity of said radiation being indicated by the frequency of said pulses, in combination with a D.-C. voltage source for said discharge chamber and control means for said voltage source coupled to said discharge chamber operative to vary the D.-C. voltage output of said voltage source responsively to changes in the magnitude of said pulses.

2. A radiation counter of the type comprising a radiation-sensitive element, of the type wherein radiation traversing said element is operative to produce voltage pulses, the intensity of said radiation being indicated by the frequency of said pulses, in combination with an amplifier coupled to said radiation-sensitive element for amplifying said pulses, a D.-C. voltage source for said element, and control means for said voltage source coupled to said amplifier operative to vary the voltage output of said voltage source responsively to changes in the magnitude of said pulses.

3. A radiation counter of the type comprising a gas-filled discharge chamber, an impedance element, and a voltage supply in series wherein radiation traversing said discharge chamber is operative to produce voltage pulses across said impedance element, the frequency of said pulses representing the intensity of said radiation, in combination with an amplifier coupled to said impedance element for amplifying said pulses, indicator means fed by said amplifier, and stabilizing apparatus comprising rectifier means having an input and an output, said input being coupled to said amplifier and said output being connected in shunt with an electric network comprising a resistor and a capacitor in parallel, and control means for said voltage supply operative responsively to changes in the potential across said electric network to change the voltage output of said voltage supply.

4. Radiation-measuring apparatus comprising in combination a gas-filled discharge chamber, a D.-C. voltage supply, two impedance elements, said impedance elements being connected to form a series loop with said voltage supply and said discharge chamber, said discharge chamber being operative to conduct current transiently in response to radiation traversing said chamber and thereby to produce voltage pulses at a rate governed by the intensity of such radiation, an electron-discharge device comprising a space-conduction path and a control element therefor, said space-conduction path being connected in parallel with the series circuit comprising one of said impedance elements and said discharge chamber, an amplifier coupled to said discharge chamber for amplifying said pulses, indicator means fed by said amplifier, and means coupled to the output of said amplifier and to said control element operative responsively to changes in the pulse magnitude to vary the potential on said control element.

SERGE A. SCHERBATSKOY.

References Cited in the file of this patent

UNITED STATES PATENTS

| Number | Name | Date |
|---|---|---|
| 2,222,451 | Trost | Nov. 19, 1940 |
| 2,407,853 | Smith | Sept. 17, 1946 |
| 2,443,006 | Johnson | June 8, 1948 |
| 2,465,938 | Shonka | Mar. 29, 1949 |
| 2,475,613 | Hastings | July 12, 1949 |
| 2,477,802 | Herzog et al. | Aug. 2, 1949 |
| 2,496,886 | Molloy et al. | Feb. 7, 1950 |